US 6,996,648 B2

(12) United States Patent
Vu

(10) Patent No.: US 6,996,648 B2
(45) Date of Patent: Feb. 7, 2006

(54) GENERATING NOTIFICATION THAT A NEW MEMORY MODULE HAS BEEN ADDED TO A SECOND MEMORY SLOT IN RESPONSE TO REPLACEMENT OF A MEMORY MODULE IN A FIRST MEMORY SLOT

(75) Inventor: Paul H. Vu, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 331 days.

(21) Appl. No.: 10/447,117

(22) Filed: May 28, 2003

(65) Prior Publication Data

US 2004/0243731 A1    Dec. 2, 2004

(51) Int. Cl.
G06F 3/00       (2006.01)
G06F 13/00      (2006.01)
G06F 11/00      (2006.01)

(52) U.S. Cl. .................. 710/302; 710/8; 710/9; 710/10; 710/14; 710/38; 710/104; 710/301; 714/7; 714/42; 714/5

(58) Field of Classification Search .............. 710/302, 710/103, 301, 102, 104, 8–10, 14, 38; 714/7, 714/42, 5
See application file for complete search history.

(56) References Cited

U.S. PATENT DOCUMENTS

| 6,098,132 A | 8/2000 | Olarig et al. |
| 6,401,157 B1 | 6/2002 | Nguyen et al. |
| 6,418,492 B1 | 7/2002 | Papa et al. |
| 6,487,623 B1 | 11/2002 | Emerson et al. |
| 6,854,070 B2 * | 2/2005 | Johnson et al. ............... 714/5 |
| 6,874,060 B2 * | 3/2005 | Blood et al. ............... 711/111 |
| 2004/0133915 A1 * | 7/2004 | Moody et al. ............... 725/86 |

* cited by examiner

Primary Examiner—Tammara Peyton

(57) ABSTRACT

A system includes memory slots to receive memory modules. In response to detecting replacement of a first memory module with a second memory module in a first memory slot, a notification is generated to indicate that a new memory module has been added to a second memory slot that is different from the first memory slot.

24 Claims, 2 Drawing Sheets

GENERATING NOTIFICATION THAT A NEW MEMORY MODULE HAS BEEN ADDED TO A SECOND MEMORY SLOT IN RESPONSE TO REPLACEMENT OF A MEMORY MODULE IN A FIRST MEMORY SLOT

BACKGROUND

Computers include various components, such as a central processing unit (CPU), memory, mass storage, and other components. As speed requirements increase and as software applications place ever increasing demands on a computer's hardware resources, such as the CPU and memory, a user may find it desirable to upgrade certain components, such as the storage capacity and operating speed of the memory.

In many computers, adding memory modules to a computer typically involves first shutting down the computer before the memory modules are added. For certain applications, such as those involving servers on a network, shutting down the computer to add memory capacity causes the computer to become unavailable, which may be undesirable. To address this, hot plugging techniques have been implemented to enable new memory modules to be added to a computer while the computer remains live (that is, while the system is operating and remains available). Hot plugging memory modules present several challenges. For example, certain operating systems within a computer, such as WINDOWS® operating systems from Microsoft Corporation, are unable to properly handle the hot upgrade of a memory module which involves the removal of an existing memory module and the replacement of the memory module with a new memory module that has a larger storage capacity. Without the ability to handle hot upgrades of memory modules within a computer, flexibility is reduced.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

Figure 1:
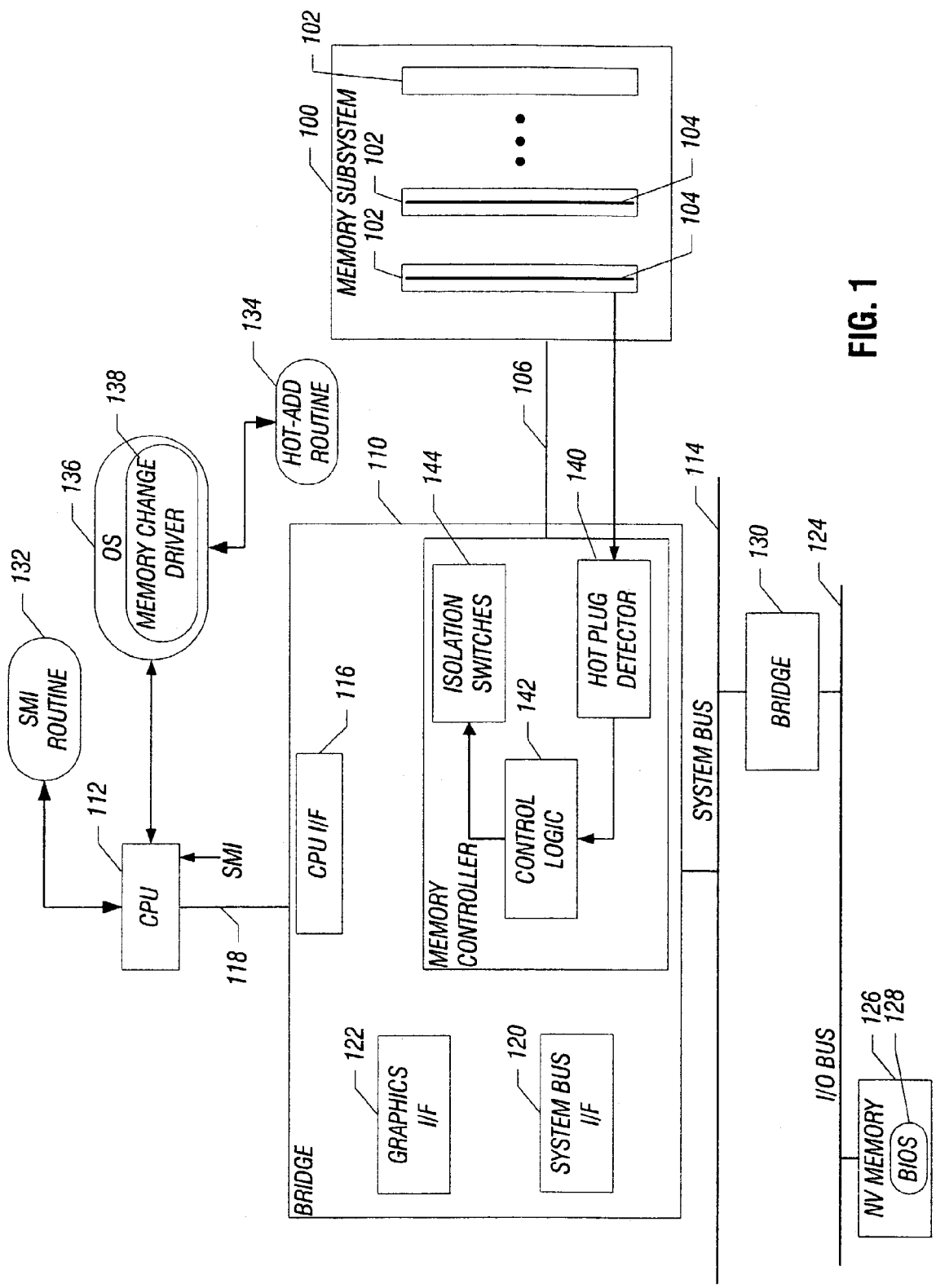
FIG. 1 is a block diagram of an example arrangement of a system.

FIG. 1 shows an example system, such as a computer, that includes a memory subsystem 100, which may be implemented as a memory card, a memory cartridge, and so forth. The memory subsystem 100 has multiple memory sockets or slots 102 to receive memory modules 104. As used here a "memory module" refers to either a unitary memory device (such as a dynamic random access member (DRAM)), a static random access memory (SRAM), and so forth), a multi-unit memory module (such as a single in-line memory module (SIMM), a double in-line memory module (DIMM), and so forth), or any other memory package or assembly that contains one or multiple memory devices.

The memory subsystem 100, if implemented as a card or cartridge, is plugged into a connector on the motherboard. Alternatively, the memory slots 102 can be directly provided on the motherboard.

In the example of FIG. 1, one or more memory slots 102 are empty and thus available to receive additional memory modules to add to the capacity of the memory subsystem 100. One feature of the memory subsystem 100 is the ability to "hot" add new memory modules to empty memory slots 102 in the memory subsystem 100. This refers to the insertion of a memory module 104 into an available memory slot 102 while the system remains live and operational. An alternative technique to change the capacity of the memory subsystem 100 is to remove an existing memory module 104 from a slot 102 and to replace the existing memory module with a new memory module having a larger storage capacity, while the system remains live. This is referred to as a "hot" upgrade of the memory subsystem 100.

According to some embodiments of the invention, a mechanism is provided to enable an operating system 136 in the system to recognize both a hot add and a hot upgrade of a memory module. When a memory module is hot added to an empty memory slot 102, the operating system 136 is notified of the added memory module. The notification includes the following information (among other information): size, starting address, slot (an identifier of a slot 102 to which the new memory module has been inserted), and memory attributes. This enables the operating system 136 to start using the new memory module. When a hot upgrade is performed, an existing memory module in an occupied slot 102 is replaced with a new memory module. Certain operating systems 136 (such as WINDOWS® operating systems) are unable to properly handle the added capacity of a larger memory module that is inserted into a previously occupied memory slot 102. An example WINDOWS® operating system is WINDOWS® Server 2003. However, in other implementations, other types of operating systems can be employed.

According to some embodiments of the invention, to address this issue, the concept of a "virtual" memory slot is defined. The virtual memory slot receives a memory module that represents the added capacity of a new memory module as compared to the replaced memory module. Thus, in the hot upgrade procedure, the notification of the new memory module provided to the operating system 136 identifies the virtual slot and a memory size that is the difference between the sizes of the new memory module and the replaced memory module. Effectively, the new memory module is divided into two modules: a first memory module inserted in the original slot and having a size equal to the replaced memory module; and a second memory module inserted in the virtual slot and having a size equal to the difference between the sizes of the new memory module and the replaced memory module. Note that the first and second memory modules are logical representations that when combined represent the total storage capacity of the new memory module. To the operating system, there has been no change in the original slot; rather, the operating system is notified that a new memory module has been added to the virtual slot.

For example, assume a computer has four physical memory slots, with a memory module having size X in slot 1. Assume further that a user has hot-upgraded the memory module in slot 1 to a larger memory size (Y). According to some embodiments instead of telling the operating system 136 that the memory module of size X in slot 1 has been upgraded to a memory module of size Y, the system informs the operating system 136 that there is a memory module of size N that has been hot added to slot V, where N=Y−X, and V is a virtual slot in addition to the four physical memory slots. In this case, virtual slot V is virtual memory slot 5. Multiple virtual memory slots can be added if further upgrades are performed.

In the example arrangement shown in FIG. 1, the memory subsystem 100 is coupled to a memory controller 108, which is provided within a bridge 110 (referred to as a "north" bridge) that is coupled to a central processing unit (CPU) 112 and to a system bus 114. An example of the system bus is a Peripheral Component Interconnect (PCI) bus. In other embodiments, other types of system buses can be employed.

The bridge 110 includes various circuitry and logic to enable components to communicate with each other. In addition to the memory controller 108, the bridge 110 includes a CPU interface 116 that is coupled to a CPU bus (sometimes referred to as a front side bus) 118, which is also connected to the CPU 112. Additionally, the bridge 110 includes a system bus interface 120 that is coupled to the system bus 114. In the example implementation, the bridge 110 also includes a graphics interface 122 that is coupled to a graphics adapter (not shown) to provide graphics capabilities in the system.

In addition to the system bus 114, the system of FIG. 1 also includes an input/output bus 124, such as an Industry Standard Architecture (ISA) bus, an Extended I/O (EIO) bus, an X bus, a low-pin count (LPC) bus, and so forth. A nonvolatile memory 126, which can be implemented with flash memory or electrically erasable and programmable read-only memory (EEPROM), is coupled to the I/O bus 124. Basic input/output system (BIOS) code 128 is stored in the nonvolatile memory 126. During system startup, the BIOS code 126 is executed by the CPU 112 to perform power-on self-test (POST) tasks. The BIOS code 126 also includes other routines to perform other tasks.

A bridge 130 (referred to as a "south" bridge) is coupled between the system bus 114 and the I/O bus 124 to enable communication between components coupled to the I/O bus 124 and the system bus 114. As noted above, the arrangement of FIG. 1 is provided as an example. In alternative embodiments, other arrangements can be used, including those in which there are not multiple levels of buses as in FIG. 1.

A memory change driver 138 is shown as being part of the operating system 136. The memory change driver 138 handles a change in the capacity of the memory subsystem 100 according to some embodiments. Instead of a driver within the operating system 136, the memory change driver 138 can alternatively be implemented as an SMI (System Management Interrupt) routine 132, which is invoked in response to assertion of an SMI caused by detection of a change in the memory subsystem 100, such as the addition of a memory module or the upgrade or replacement of a memory module. Alternatively, the memory change driver 138 can be implemented as another software module or even a hardware module, such as an application-specific integrated circuit (ASIC), embedded controller, and the like.

When a change in the memory subsystem 100 occurs, such as when a memory module is added to an empty memory slot, or when an existing memory module is replaced with a new memory module, a hot plug detector 140 in the memory controller 108 detects the hot-plugging of the new memory module. In response, the hot plug detector 140 provides an indication to control logic 142 in the memory controller 108. The control logic 142 controls isolation switches 144 in the memory controller 108 to control whether power and signaling are to be coupled to the new memory module. Although the hot plug detector 140, control logic 142, and isolation switches 144 are shown as being part of the memory controller 108 according to one embodiment, the same elements can be provided outside the memory controller 108 in other embodiments.

Figure 2:
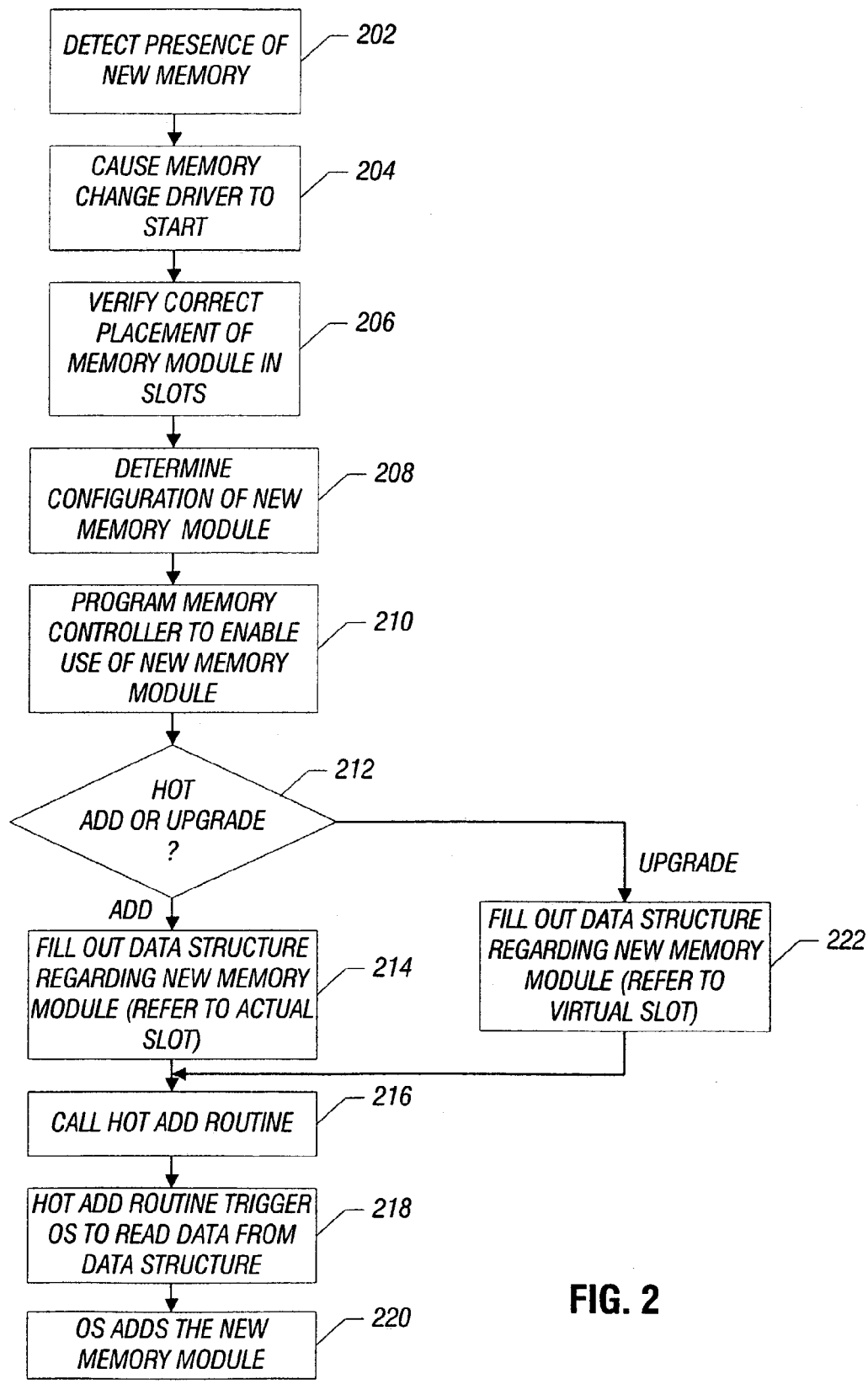
FIG. 2 is a flow diagram of a process according to an embodiment for performing a hot upgrade of a memory subsystem within the system of FIG. 1.

FIG. 2 shows the process performed in response to the addition or replacement of a memory module in the memory subsystem 100. The addition or replacement of a memory is detected (at 202) by the hot plug detector 140, which informs the control logic 142. In turn, the control logic causes the memory change driver 138 to be invoked. This can be performed by interrupt or by some other indication provided to the CPU 112.

Once invoked, the memory change driver 138 verifies (at 206) correct placement of memory modules in the memory slots. The memory change driver 138 also accesses (at 208) information in serial presence detect storage in the memory module to determine information regarding the new memory module, including its size, speed, and so forth.

Next, the memory change driver 138 programs (at 210) the memory controller 108 to enable the new memory configuration (that includes the newly added memory module). A memory test of the new memory module may also be indicated. The memory change driver 138 then determines (at 212) whether the addition or upgrade of a memory module was performed. If the change of the memory subsystem 100 is a result of hot addition of a memory module into an empty memory slot, then the memory change driver 138 fills out (at 214) a data structure regarding the new memory module that includes the following information (among others): storage size, starting memory address, memory attributes, and slot (which in this case is an identifier of the actual physical slot 102 into which the new memory module has been inserted). The memory change driver 138 then calls (at 216) a hot add routine 134 (FIG. 1). In one example implementation, the hot add routine 134 is an Advanced Configuration and Power Interface (ACPI) routine. The hot add routine 134 triggers (at 218) the operating system 136 to read data from the data structure filled at 214. Based on this information, the operating system 136 then adds (at 220) the new memory module to the system.

Note that in an alternative embodiment, instead of the hot add routine 134 triggering the operating system 136, the memory change driver 138 can trigger the operating system 136 directly to read the data structure.

If the change in memory configuration is due to a hot upgrade (in which an existing memory module was replaced with a new memory module) as determined at 212, then the memory change driver 138 fills out (at 222) the data structure for the new memory module in the following manner. The memory change driver 138 determines the added capacity (referred to as "N") represented by the new memory module over the replaced memory module. The memory size N is the difference between the size of the new memory module and the size of the replaced memory module. The memory change driver then fills out the data structure by indicating a new memory module having size N, in virtual slot V, and associated with corresponding starting memory address, memory attributes, and other information. If other hot upgrades are performed, additional virtual slots for other new memory modules can be defined.

Note that whether a memory slot is an actual physical slot or a virtual slot is transparent to the operating system 136. To the operating system, a virtual slot is just like an actual slot, with the operating system using the slot information, along with the configuration information of the memory in the respective slot, to store information relating to executing applications in the system.

Instructions of the various software or firmware modules discussed herein (such as the memory change driver 138, SMI routine 132, hot add routine 134, etc.) are stored on one or more storage devices and loaded for execution on a corresponding control unit or processor. The control unit or processor includes a microprocessor, a microcontroller, a processor module or subsystem (including one or more microprocessors or microcontrollers), or other control or computing devices.

Furthermore, as used here, a "control module" refers to a software module, a hardware module, or a combination of both. Although used in the singular sense, "control module" also refers to a plurality of modules.

Data and instructions (of the various software or firmware modules) are stored in one or more machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method for use in a system, comprising:
   detecting that a first memory module in a first memory slot has been replaced with a second memory module of larger storage size, the first memory slot being one of plural memory slots in the system; and
   generating a notification that a new memory module has been added to a second memory slot in response to detecting that the first memory module has been replaced with the second memory module in the first memory slot,
   the second memory slot different from the first memory slot.

2. The method of claim 1, wherein generating the notification that a new memory module has been added to the second memory slot comprises generating a notification that the new memory module of storage size N has been added, where N is equal to the difference in sizes between the second and first memory modules.

3. The method of claim 2, wherein generating the notification comprises generating the notification that the new memory module has been added to the second memory slot that is not one of the plural memory slots.

4. The method of claim 3, wherein generating the notification comprises generating the notification that the new memory module has been added to a virtual memory slot rather than a physical memory slot.

5. The method of claim 1, further comprising providing the notification to an operating system.

6. The method of claim 1, wherein detecting that the first memory module in the first memory slot has been replaced with the second memory module comprises detecting a hot upgrade of the first memory module with the second memory module.

7. The method of claim 1, further comprising:
   detecting that a third memory module has been added to a third memory slot, the third memory slot being one of the plural memory slots; and
   generating a notification that the third memory module has been added to the third memory slot.

8. The method of claim 7, wherein detecting that the first memory module in the first memory slot has been replaced with the second memory module comprises detecting a hot upgrade of the first memory module with the second memory module, and wherein detecting the third memory has been added to the third memory slot comprises detecting hot adding of the third memory module to the third memory slot.

9. The method of claim 1, wherein generating the notification comprises generating a notification containing at least a size of the new memory, a starting address of the new memory, and an identifier of the second memory slot.

10. A system comprising:
    first and second memory slots;
    a first memory module inserted in the first memory slot;
    a detector to detect replacement of the first memory module with a second memory module in the first memory slot; and
    a control module to generate a notification that a new memory module has been added to the second memory slot in response to detecting that the first memory module has been replaced with a second memory module,
    the second memory slot different from the first memory slot.

11. The system of claim 10, wherein the second memory slot comprises a virtual memory slot rather than a physical memory slot.

12. The system of claim 10, wherein the control module is adapted to calculate a size N of the new memory to include in the notification, the size N equal to a difference between sizes of the second and first memory modules.

13. The system of claim 12, wherein the new memory comprises a storage section of the second memory module having the size N.

14. The system of claim 12, further comprising an operating system, the operating system to receive the notification and to enable the new memory based on the notification.

15. The system of claim 10, wherein the detector is adapted to detect a hot upgrade of the first memory module with the second memory module.

16. The system of claim 10, further comprising a third memory slot, the detector to detect addition of a third memory module to the third memory slot, the control module to generate another notification that the third memory module has been added to the third memory slot.

17. An article comprising at least one storage medium containing instructions that when executed cause a system to:
    detect that a first memory module in a first memory slot has been replaced with a second memory module of larger storage size, the first memory slot being one of plural memory slots in the system; and
    generate a notification that a new memory module has been added to a second memory slot in response to detecting that the first memory module has been replaced with the second memory module in the first memory slot,
    the second memory slot different from the first memory slot.

18. The article of claim 17, wherein generating the notification that a new memory module has been added to the second memory slot comprises generating a notification that the new memory module of storage size N has been added, where N is equal to the difference in sizes between the second and first memory modules.

19. The article of claim 18, wherein generating the notification comprises generating the notification that the new memory module has been added to the second memory slot that is not one of the plural memory slots.

20. The article of claim 19, wherein generating the notification comprises generating the notification that the new memory module has been added to a virtual memory slot rather than a physical memory slot.

21. The article of claim 17, wherein the instructions when executed cause the system to provide the notification to an operating system.

22. The article of claim 17, wherein detecting that the first memory module in the first memory slot has been replaced with the second memory module comprises detecting a hot upgrade of the first memory module with the second memory module.

23. The article of claim 17, wherein the instructions when executed cause the system to:

detect that a third memory module has been added to a third memory slot, the third memory slot being one of the plural memory slots; and generate a notification that the third memory module has been added to the third memory slot.

24. The article of claim 17, wherein generating the notification comprises generating a notification containing at least a size of the new memory, a starting address of the new memory, and an identifier of the second memory slot.

* * * * *